Sept. 6, 1932.  L. S. HALL  1,875,445

CORD FABRIC

Filed Sept. 25, 1930

Inventor
Lindsay S. Hall

By  Bee+Bush
Attorneys

Patented Sept. 6, 1932

1,875,445

UNITED STATES PATENT OFFICE

LINDSAY S. HALL, OF NEW BEDFORD, MASSACHUSETTS, ASSIGNOR TO THE GOODYEAR TIRE & RUBBER COMPANY, OF AKRON, OHIO, A CORPORATION OF OHIO

CORD FABRIC

Application filed September 25, 1930. Serial No. 484,289.

This invention relates to cord fabrics and it has particular relation to such fabrics as those employed in the construction of breaker strips for pneumatic tires.

The object of the invention is to provide a breaker strip for pneumatic tires which possesses a higher degree of resiliency and extensibility than the fabrics which have heretofore been employed in that capacity.

In the construction of pneumatic tires for vehicles, a carcass is ordinarily constructed of a plurality of plies of relatively heavy cord fabric. This carcass constitutes a strain resistant member which prevents excessive expansion of the tire by the pneumatic pressure imposed against the walls thereof by an inflated inner tube. In order to resist wear or abrasions, this cord carcass is covered with a relatively heavy layer of tough wear-resistance rubber compound termed a "tread element". During service upon the vehicle wheels, the outer layer of rubber is exposed to relatively heavy pounding upon inequalities in the road surface. Therefore, in order to prevent loosening of the covering or tread portion from the carcass, it is customary to dispose one or more plies of very heavy cord material encased within a cushion of relatively soft elastic rubber compound, and termed a "breaker strip", upon the carcass between the latter and the tough relatively stiff tread.

This breaker strip constitutes a cushion which permits slight movement between the tread element and the tire carcass and also serves more uniformly to distribute the thrusts of small objects upon the roadway over which the vehicle is traveling, to various portions of the carcass. The tendency of separation between the carcass and the tread is thus materially reduced. As heretofore constructed, the breaker strips have been composed of heavy cords. These cords may consist of 23's yarns spun in groups of five to form strands which in turn are twisted in groups of three to form the cords. The term "23's", as here employed, indicates that 23 units of yarn constitute one pound. As applied to cotton cord, each unit of yarn is 840 yards in length.

The cords so formed were fabricated into breaker strip fabric by arranging them in parallel relation and cross-connecting them by means of very weak threads, called "picks", which served to bind them into a sheet during the process of forming the fabric into breaker strips and assembling the latter into tires. The fabric so constructed was not entirely satisfactory in actual service because sharp indentations into the tires resulting from contact of the tires with stones or other relatively sharp objects frequently caused breaking of the cords in certain localized areas because of the fact that there was insufficient elasticity in the cords to insure transmission of a proper proportion of the strain to adjacent cords.

It has heretofore been proposed to overcome this defect by so increasing the extensibility of the cords constituting the breaker strip that they would stretch materially without breaking. One method proposed for accomplishing this result consists in "crimping" the fabric by some convenient means in such manner as to impart small waves or sinuations to the cords. These sinuations permitted slight extensions of the cords without localized rupture.

This invention consists in the provision of a fabric in which the main body of the warp is composed of a number of cords of conventional size, weight and construction and which are so woven as to lie in sinuous or wavy paths whereby to obtain the desired degree of stretch or extensibility in the fabric. The sinuations are maintained in the fabric by interweaving the sinuous cords with a relatively small number of substantially straight cords which prevent extension of the sinuous cords during the manipulations to which the fabric is subjected in the process of preparing and assembling them into tire carcasses.

For a better understanding of the invention, reference may now be had to the accompanying drawing, forming a part of this specification, of which:

Figure 1:
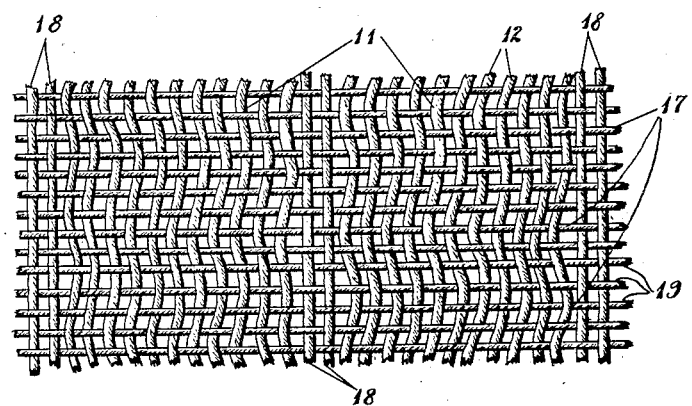
Fig. 1 is a fragmentary plan view of cord breaker fabric which is constructed according to this invention.

A breaker strip 10, constructed according to the invention, comprises a plurality of groups 11 of relatively heavy warp cords 12. These cords are of conventional form and may comprise "23's" yarns 14 twisted in groups of 5 to form strands 16, the strands in turn being twisted in groups of 3 to form the cords or cables 12. The cords 12 are arranged in such spaced relationship in the breaker fabric as to have any desired spacing, e. g. a count of thirteen per inch. Crimping of the fabric is secured by weaving the cords 12 under little or no tension whereby to impart numerous small sinuations 17 thereto. The degree of sinuation required will vary according to the type of tire in which the fabric is to be used. However, an amount sufficient to impart twelve percent stretch to the fabric is satisfactory for most purposes.

For purposes of permanently maintaining these sinuations during processing of the fabric, the cords 12 are interspersed with a number of cords 18 which, because of their being woven under tension, lie in substantially straight paths and therefore, are substantially inextensible. The relative numbers of sinuous cords and straight cords of course may be varied as desired. However, excellent results may be obtained in most cases by employing groups of twelve sinuous cords alternating with groups of two substantially straight cords. Of course, these values are largely arbitrary and may be varied at will. The entire body of warp cords thus obtained is bonded together into a fabric unit by means of filler cords or picks 19 of relatively light construction (e. g. a cord comprising four 23's yarns). The count of these filler cords or picks may be varied at will. However, in the embodiment of the invention under consideration, a count of ten per inch is satisfactory.

Figure 4:
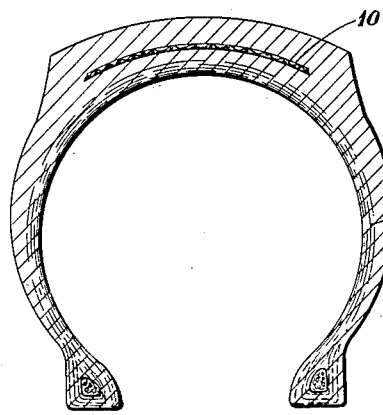
Fig. 4 is a cross-sectional view of a completed tire embodying the new type of breaker strip.
Figure 2:
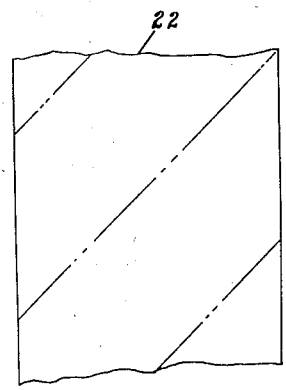
Fig. 2 is a fragmentary plan view of a strip of breaker fabric which has been cut upon a bias in order to provide units for the construction of tires.
Figure 5:
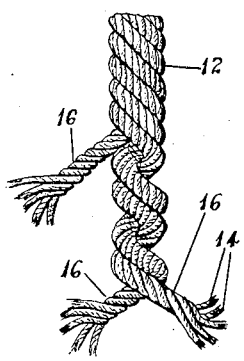
Fig. 5 is a fragmentary elevational view of a cord which is designed for use in constructing a tire fabric.
Figure 3:
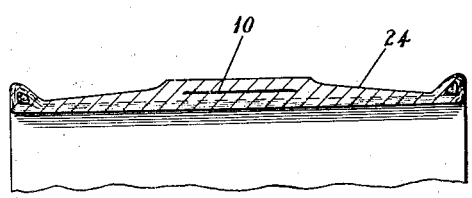
Fig. 3 is a fragmentary cross-sectional view of a flat built tire band in which an improved breaker strip is incorporated.

A breaker fabric constructed in this manner is coated with gum, and after being cut upon the bias into units 22 (see Fig. 2), it is assembled into a tire band 24 which in turn is shaped, as indicated in Fig. 4, to form a tire 25. Since the steps of cutting the fabric, subsequently assembling and shaping it into a tire are conventional and do not constitute a portion of the present invention, they need not be described in detail.

During the process of vulcanizing the tires containing the improved breaker strips, the rubber compound becomes set about the individual cords 12 and thus serves permanently to maintain the crimp in the latter even though the relatively straight cords 18 which are employed for purposes of temporarily maintaining the crimp in the fabric become broken by reason of pounding by irregularities in the road surfaces over which the tires may travel. The sinuations thus maintained in the fabric permit a slight amount of expansion or stretch in the cords without subjecting them to severe strain and thus permit the transmission of a portion of the shock created by irregularities in the road surface to adjacent portions of the tire. More adequate cushioning action between the tread element and the main body of the tire carcass is thus obtained. Furthermore, during use, it is found that tire carcasses tend slightly to stretch or increase in size because of the pressure employed for inflating purposes.

Where the conventional type of breaker strip is employed, this stretching of the carcass causes an excessive strain to be placed thereon and may cause or hasten ruptures in the latter. Where a properly crimped breaker strip is employed, the stretch of the carcass is accompanied by corresponding stretch in the breaker strip and therefore, excessive strain upon the latter is obviated. It is thus apparent that the present invention contemplates a relatively simple method of increasing the extensibility of breaker strip fabric.

The invention is not restricted to use in connection with breaker strips because it is also possible to employ a tire carcass which is fabricated in part or entirely from crimped fabric substantially similar to the fabric employed in the construction of the breaker.

Although I have illustrated only the preferred forms of the invention and have described those forms in detail, it will be apparent to those skilled in the art that the invention is not so limited but that various modifications may be made therein without departing from the spirit of the invention or from the scope of the appended claims.

What I claim is:

1. In or for a pneumatic tire carcass, a breaker strip comprising a warp composed of groups of sinuous cords separated by substantially straight cords of the same size as the sinuous cords.

2. A tire fabric comprising a plurality of groups of relatively independent cords which are sinuous in the plane of the fabric and parallel with each other, straight cords arranged between the successive groups of sinuous cords, said straight cords being of substantially the same weight and size as the sinuous cords and adapted to relieve the sinuous cords of tensile strains during the processing of the fabric.

In witness whereof, I have hereunto signed my name at Akron, in the county of Summit and State of Ohio, U. S. A., this 17th day of September, 1930.

LINDSAY S. HALL.